US010325291B2

(12) United States Patent
Ge et al.

(10) Patent No.: US 10,325,291 B2
(45) Date of Patent: Jun. 18, 2019

(54) ADJUSTING RESERVE PRICES FOR ADVERTISEMENTS PRESENTED TO SOCIAL NETWORKING SYSTEM USERS

(71) Applicant: Facebook, Inc., Menlo Park, CA (US)

(72) Inventors: Hong Ge, Cupertino, CA (US); Lars Seren Backstrom, Mountain View, CA (US); Tanmoy Chakraborty, San Francisco, CA (US); Chinmay Deepak Karande, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 1009 days.

(21) Appl. No.: 14/051,291

(22) Filed: Oct. 10, 2013

(65) Prior Publication Data
US 2015/0106191 A1    Apr. 16, 2015

(51) Int. Cl.
  *G06Q 30/00*    (2012.01)
  *G06Q 30/02*    (2012.01)
(52) U.S. Cl.
  CPC ..... *G06Q 30/0275* (2013.01); *G06Q 30/0246* (2013.01); *G06Q 30/0269* (2013.01)
(58) Field of Classification Search
  None
  See application file for complete search history.

(56) References Cited

U.S. PATENT DOCUMENTS 7,251,589 B1 *   7/2007   Crowe ................... G06F 17/18
                                                          702/181
9,292,515 B1 *   3/2016   Zigmond ........... G06Q 30/0242
2006/0095281 A1 *   5/2006   Chickering ............ G06Q 30/02
                                                          705/37

(Continued)

FOREIGN PATENT DOCUMENTS

JP   2003-228675       8/2003
JP   2008-083763 A     4/2008

(Continued)

OTHER PUBLICATIONS

Allan, Sterling D., Optimize Google AdSense Revenue by Reducing the Number of Ads on a Page, Sep. 9, 2004, www.webpronews.com, 3 pages.*

(Continued)

*Primary Examiner* — Michael W Schmucker
(74) *Attorney, Agent, or Firm* — Fenwick & West LLP

(57) ABSTRACT

A social networking system dynamically adjusts a number of advertisements presented to a user along with organic content items by modifying a minimum bid amount associated with advertisements eligible for presentation to the user. Increasing the minimum bid amount decreases the number of advertisements presented to the user while decreasing the minimum bid amount increases the number of advertisements presented to the user. An engagement score measuring the user's estimated interaction with a content feed including organic content items without advertisements and an engagement score measuring the user's estimated interaction with a content feed including organic content items and advertisements are determined. A target score is determined based on the engagement scores, and a difference between the target score and a threshold value is used to modify a minimum price of advertisements eligible for presentation to the user.

20 Claims, 2 Drawing Sheets

(56) References Cited

U.S. PATENT DOCUMENTS

| | | | |
|---|---|---|---|
| 2006/0229938 A1* | 10/2006 | Yan | G06Q 30/02 705/14.71 |
| 2009/0083098 A1 | 3/2009 | Schwarz | |
| 2010/0185507 A1 | 7/2010 | Tokuda | |
| 2010/0324990 A1 | 12/2010 | D'Angelo et al. | |
| 2011/0238494 A1 | 9/2011 | Park | |
| 2011/0288935 A1 | 11/2011 | Elvekrog et al. | |

FOREIGN PATENT DOCUMENTS

| | | |
|---|---|---|
| JP | 2011-503701 A | 1/2011 |
| JP | 2012-519331 A | 8/2012 |
| JP | 2013-182595 A | 9/2013 |
| KR | 10-2011-0079420 A | 7/2011 |
| KR | 10-2011-0100030 A | 9/2011 |
| KR | 10-2011-0137513 A | 12/2011 |

OTHER PUBLICATIONS

PCT International Search Report and Written Opinion, PCT Application No. PCT/US2014/058364, dated Dec. 23, 2014, eleven pages.
Canadian Intellectual Property Office, Office Action, Canadian Patent Application No. 2,923,996, dated Jan. 25, 2017, four pages.
Japan Patent Office, Office Action, Japanese Patent Application No. 2016-521351, dated Jun. 5, 2018, five pages.
Canadian Intellectual Property Office, Office Action, Canadian Patent Application No. 2,923,996, dated Oct. 5, 2018, four pages.

* cited by examiner

ADJUSTING RESERVE PRICES FOR ADVERTISEMENTS PRESENTED TO SOCIAL NETWORKING SYSTEM USERS

BACKGROUND

This invention relates generally to social networking systems, and in particular to presenting advertisements to users of a social networking system.

Social networking systems allow users to connect to and communicate with other users of the social networking system. Users create profiles on a social networking system that are tied to their identities and include information about the users, such as interests and demographic information. The users may be individuals or entities such as corporations or charities. Because of the increasing popularity of social networking systems and the significant amount of user-specific information maintained by social networking systems, a social networking system allows users to easily communicate information about themselves to other users. For example, the social networking system generates stories describing actions performed by social networking system users and presents the stories to other social networking system users. In addition to stories, other types of organic content describing social networking system users may be presented, such as status updates, location check-ins, photos, videos, or any other suitable information.

In addition to presenting organic content describing users, a social networking system may also present advertisements to its users, allowing the social networking system to obtain revenue by charging advertisers for presentation of the advertisements. Presenting advertisements to social networking system users allows an advertiser to gain public attention for products or services or to persuade social networking system users to take an action regarding the advertiser's products, services, opinions, or causes. A conventional social networking system selects advertisements for presentation to one or more users based on bid amounts associated with various advertisements. For example, a social networking system selects and presents advertisements having maximum bid amounts to maximize the revenue obtained by the social networking system from presenting advertisements.

A social networking system may present advertisements together with organic content, such as stories describing actions performed by social networking system users. However, presenting advertisements and organic content together divides a user's attention between the advertisements and the organic content, decreasing the amount of user interaction with the organic content, which may decrease overall user interaction with the social networking system. For example, if a large number of advertisements are presented to a user, the user may become frustrated with increased difficulty in viewing stories describing actions of other social networking system users and interact less with the social networking system. Further, a user may spend more time interacting with third party systems associated with advertisements rather than the social networking system if a large number of advertisements are presented by the social networking system. Users providing a high amount of interaction with a social networking system when presented with organic content and advertisements present opportunities for the social networking system to generate additional revenue by increasing the number of advertisements presented to these users. However, this additional revenue is often unrealized by a conventional social networking system, which lacks the ability to gauge a user's amount of interaction with the social networking system.

SUMMARY

To modify a number of advertisements included in various content items presented to a social networking system user, the social networking system determines a reserve price for advertisements eligible for presentation to the user. For example, the social networking system determines a reserve price for advertisements incorporated into a feed of various content items presented to a social networking system user. The reserve price determined by the social networking system determines the minimum bid amounts of advertisements eligible for presentation to the user. The number of advertisements eligible for presentation to the user is inversely proportional to the reserve price, as increasing the reserve price decreases the number of advertisements eligible for presentation to a user, while decreasing the reserve price increases the number of advertisements eligible for presentation to the user. Hence, the number of advertisements presented to the user decreases when the reserve price increases and the number of advertisements presented to the user increases when the reserve price decreases. Modifying the reserve price associated with presenting advertisements to a user allows the social networking system to modify the number of advertisements included in content items presented to the user to provide an optimal amount of user interaction with the social networking system.

To determine the reserve price for presenting advertisements to a user, the social networking system compares a target score that estimates a demand placed on a user's attention by advertisements with a threshold value. In one embodiment, the social networking system determines an engagement score of the user for organic content items in a content feed and determining an engagement score for organic content items and advertisements in a content feed. The target score is then determined based on a difference between the engagement score for organic content items in a content feed and the engagement score for organic content items and advertisements in a content feed.

The target score is compared to a threshold value that specifies a desired amount of user interaction with organic content items. An amount of modification to the reserve price associated with presentation of advertisements to the user is determined based on the amount of difference between the target score and the threshold value. If the target score is greater than the threshold value, the reserve price is decreased, which increases the number of advertisements presented in subsequent content feeds presented to the user. Similarly, if the target score is less than the threshold value, the reserve price is increased, which decreases the number of advertisements in subsequent content feeds presented to the user.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
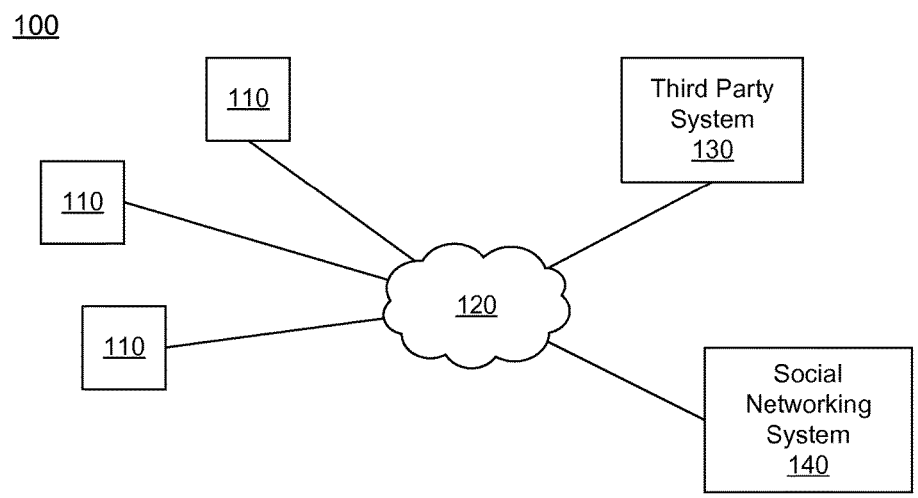
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
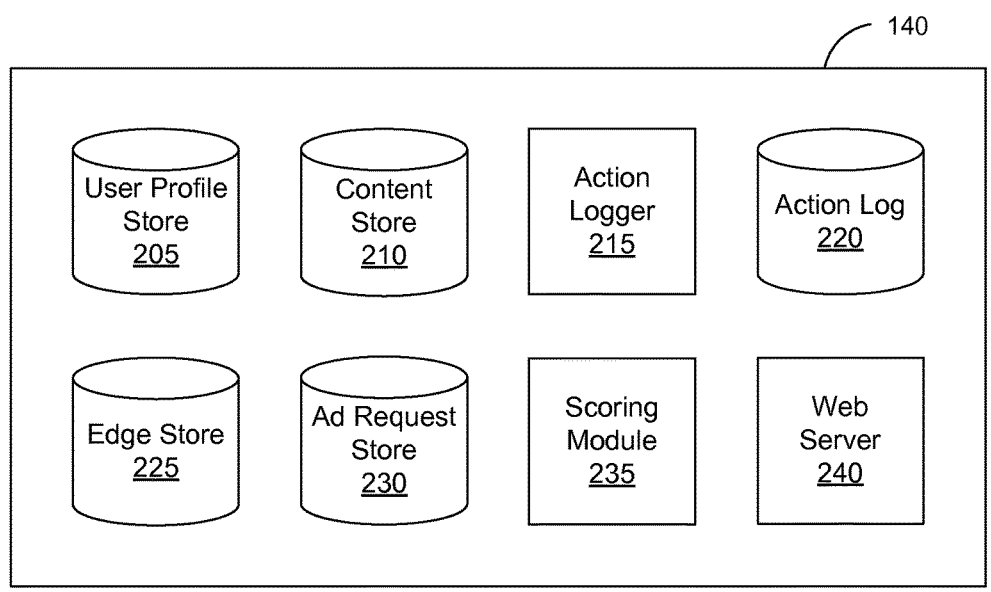
FIG. 2 is a block diagram of a social networking system, in accordance with an embodiment.

FIG. 2 is an example block diagram of an architecture of the social networking system 140. The social networking system 140 shown in FIG. 2 includes a user profile store 205, a content store 210, an action logger 215, an action log 220, an edge store 225, an ad request store 230, a scoring module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the social networking system 140 if the advertisement is presented to a user, if the advertisement receives a user interaction, or based on any other suitable condition. For example, the bid amount specifies a monetary amount that the social networking system 140 receives from the advertiser if the advertisement is displayed and the expected value is determined by multiplying the bid amount by a probability of the advertisement being accessed by a user.

Additionally, an advertisement request may include one or more targeting criteria specified by the advertiser. Targeting criteria included in an advertisement request specify one or more characteristics of users eligible to be presented with advertisement content in the ad request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the social networking system 140. Targeting criteria may also specify interactions between a user and objects performed external to the social networking system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The scoring module 235 determines engagement scores measuring an expected amount of user interaction with individual organic content items (i.e., content items presented to a user by the social networking system 140 without receiving compensation for the presentation) and/or advertisements to be presented to a social networking system user via a content feed. In one embodiment, various organic content items are presented in a feed including multiple content items. For example, the social networking system 140 presents a newsfeed to a user including fifty items of organic content (e.g., stories describing actions performed by additional users connected to the user), and the scoring module 235 determines an expected amount of interaction (e.g., sharing a story with another user, expressing a preference for a story, commenting on a story, etc.) between the user and the fifty organic content items.

The scoring module 235 determines one or more partial engagement scores that are used to determine the engagement scores. A partial engagement score measures the expected amount of user interaction with a content item, such as an organic content item or an advertisement, presented to a user in a particular location of a content feed. In some embodiments, the scoring module 235 may adjust one or more of the partial engagement scores by a position discount associated with a location of the content feed in which a content item is presented. A position discount for a position reflects a decrease in expected user interaction with a content item when it is presented in the position; for example, the position discount reflects a decrease in expected user interaction with a content time when the content item is presented in a position relative to presentation of the content item in a reference position of the content feed. The partial engagement scores may be based on information retrieved from the user profile store 205, the content store 210, the action log 220, and/or the edge store 225. For example, a partial engagement score may be based on affinities between the user and an object or between the user and another user associated with various organic content items. Additionally, prior actions associated with the user and associated with content items previously presented to the user may be used to determine the expected amount of user interaction with the organic content items to be presented. In one embodiment, user interactions with content items presented within a specified time interval are retrieved from the action log 220 and used to determine the engagement score for one or more organic content items and/or advertisements.

For example, a ranking of content items is generated, with organic content items having positions in the ranking based on prior user interactions and affinities towards objects or topics associated with organic content items, and advertisements having positions in the ranking based on bid amounts associated with the advertisements as well as user affinities and prior user interactions. In one embodiment, an engagement score for presenting organic content items without advertisements is determined from the ranking by removing advertisements from the ranking and using the ranking of organic content items to determine the positions of the content feed in which the organic content items are presented without advertisements. Similarly, an engagement score for presenting organic content items with advertisements is determined by using the ranking of organic content items and advertisements to determine positions in which organic content items and advertisements are presented.

Additionally, the scoring module 235 calculates a target score based on a difference between the engagement score measuring the total user interaction with a content feed including organic content without advertisements and the engagement score measuring user interaction with a content feed including organic content items and advertisements. The scoring module 235 also compares the target score to a threshold value, with the comparison determining an adjustment to the reserve price. For example, if the target value is greater than the threshold value, the scoring module 235 is configured to reduce the reserve bid price, which increases the number of advertisements in subsequent content feeds. Similarly, if the target value is less than the threshold value, the scoring module 235 is configured to increase the reserve price, which decreases the number of advertisements in subsequent content feeds.

The web server 240 links the social networking system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that is stored in the content store 210. Additionally, the web server 240 may provide application programming interface (API) functionality to send data directly to native client device operating systems, such as IOS®, ANDROID™, WEBOS® or BlackberryOS.

Modifying a Reserve Price for Presenting Advertisements to a User

Figure 3:
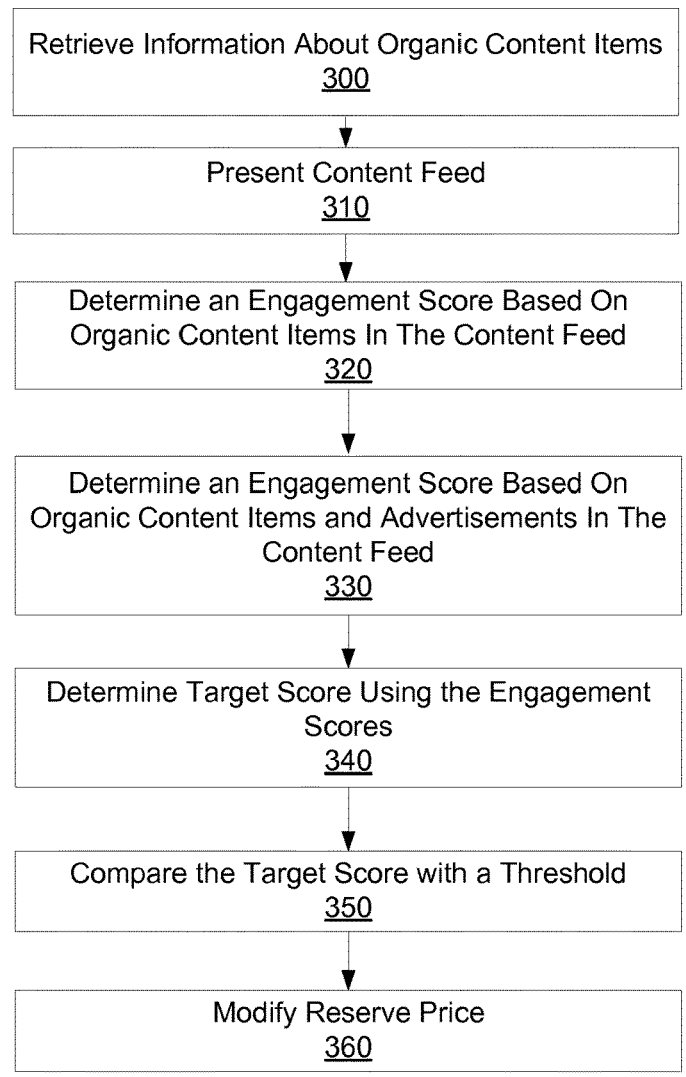
FIG. 3 is a flow chart of a method for modifying a reserve price for advertisements displayed to a social networking system user, in accordance with an embodiment.

FIG. 3 is a flow chart of one embodiment of a method for modifying a reserve price for advertisements displayed to a social networking system user. The social networking system 140 retrieves 300 information about organic content items to be presented to a user when the social networking system 140 receives a request to present content items to the user. For example, the social networking system 140 retrieves 300 information describing actions performed by additional users of the social networking system 140 connected to a user and generates stories identifying the additional users and the performed actions (e.g., check-ins, page posts, status updates, upcoming events).

One or more of the organic content items are presented 310 to the user along with one or more advertisements in a content feed. For example, the social networking system 140 presents 310 a newsfeed to the user including organic content items and one or more advertisements. The content feed includes various slots, each corresponding to a position in a display. In some embodiments, some or all of the slots are associated with position discounts that may be applied to prices charged to advertisers for presenting an advertisement in a position associated with the slot. As further described above in conjunction with FIG. 2, a position discount is based at least in part on an expected change in user interaction with a content item presented in a slot other than a reference slot.

After presentation of the organic content items and advertisements to the user, an engagement score measuring the total user interaction a content feed including the with the organic content items is determined 320. In some embodiments, the engagement score is determined 320 by calculating a partial engagement score for one or more of the organic content items in a content feed, and summing the determined partial engagement scores to obtain a total engagement score value of the content feed without advertisements. The engagement score determined for user interaction with organic content represents expected user interaction with a content feed presenting organic content items and not presenting advertisements. In one embodiment, content items are associated with slots in the content feed based on a ranking of content items based on user affinities for content items, prior user interactions with content items, and additional information (e.g., bid amounts associated with advertisements). To determine 320 the engagement score of user interaction with organic content items, content items other than organic content items are removed from the ranking, with the resulting ranking of organic content items used to determine the position of organic content items in a content feed, which are used to determine partial engagement scores for various organic content items. A partial engagement score measures the expected amount of user interaction with a content item (e.g., organic content item or advertisement) presented in a particular location of the content feed. For example, in some embodiments, one or more of the partial engagement scores are adjusted by position discounts associated with the location of the organic content item in the content feed.

The partial engagement scores calculated when determining 320 the engagement score for a content feed including organic content items measure the expected amount of user interaction with an organic content item presented in a particular location of the content feed. The expected amount of interaction between a user and an organic content item may be based on specific types of prior actions (e.g., commenting, expressing a preference for a content item, sharing a content item, etc.) by the user associated with previously presented content items; for example, the expected amount of interaction is determined based on the user's prior indications of preference for previously presented content items within a specified time interval. This determination may be based on information retrieved from the user profile store 205, the action log 220, or the edge store 225 describing interactions between the user and presented organic content items.

The social networking system 140 also determines 330 an engagement score for the content feed including organic content items as well as advertisements. In some embodiments, this determination is made by determining a partial engagement score for the one or more of the organic content items in the content feed and determining a partial engagement score for the one or more advertisements in the content feed. The partial engagement scores for one or more organic content items in the content feed are combined to generate a total organic content engagement score and the partial engagement scores for one or more advertisements in the content feed are combined to generate a total advertisement engagement score. Combining the total organic engagement score and the total advertisement engagement score results in the engagement score for the content feed including organic content items and advertisements. Including advertisements in the content feed causes one or more organic content items to be displaced, which changes user interaction with the content feed relative to presentation of a content feed including organic content items with no advertisements. Calculating the engagement score for the content feed including organic content without advertisements and the engagement score of the content feed including organic content and advertisements allows determination of the change in user interaction based on the inclusion of advertisements. In some embodiments, one or more of the partial engagement scores for organic content items or partial engagement score for advertisements are adjusted by position discounts associated with the location of an organic content item or an advertisement, respectively, in the content feed. Additionally, one or more of the partial engagement scores for organic content items or for advertisements are based in part on information about the layout with which the items are presented 310 (e.g., the proportion of presented advertisements to presented organic content items, the proportion of presented organic content items to presented advertisements, the types of presented advertisements, the placement of presented advertisements relative to presented organic content items).

Based on the engagement score for the content feed including organic content items and the engagement score and the engagement score for the content feed including organic content items and advertisements, a target score is determined 340. In some embodiments, the target score is determined based on a difference between the engagement score for the content feed including organic content items and the engagement score and the engagement score for the content feed including organic content items and advertisements. For example, the target score is based on a magnitude of the difference between the engagement score for the content feed including organic content items and the engagement score and the engagement score for the content feed including organic content items and advertisements. As another example, the target score is a ratio of the difference between the engagement score for the content feed including organic content items and no advertisements and the engagement score for the content feed including organic content items and advertisements, and the engagement score for the content feed including organic content items and no advertisements. The target score represents an estimated change in user interaction with the content feed including organic content items and advertisements relative to user interaction with the content feed including organic content items without advertisements.

In one embodiment, the social networking system 140 compares 350 the target score with a threshold value. In some embodiments, the social networking system 140 determines the difference between the target value with the threshold value. Based on the comparison, the social networking system 140 modifies 360 a reserve price for presentation of advertisements to the user along with organic content items. The target score may be determined 340 and compared 350 to the threshold value for various content feeds presented to a user to more accurately modify 360 the reserve price for presentation of advertisements to the user.

The reserve price specifies a minimum bid amount for advertisements to be presented to the user. For cost-per-impression priced advertisements, the reserve price may specify a minimum bid amount for advertisements, while the reserve price may specify a minimum bid amount multiplied by an expected click-through-rate for cost-per-click priced advertisements. Different reserve prices may be associated with different locations in a user's display. For example, advertisements presented in a newsfeed along with organic content items may be associated with higher reserve prices than advertisements presented adjacent to the newsfeed because advertisements included in the newsfeed are more likely to be viewed by the user than advertisements presented adjacent to the newsfeed.

A reserve price may be modified 370 in proportion to the difference between the determined amount of user interaction with organic content items presented in conjunction with advertisements and the expected amount of user interaction with organic content items. Hence, a larger difference between the determined amount of user interaction and the expected amount of user interaction causes a larger modification of the reserve price. Additionally, user interaction with organic content may be based on types of interactions. For example, the expected interaction with organic content for a user may be based on different types of actions (e.g., four comments and six indications of preferences). The difference between determined user interaction with presented organic content items and expected user interaction may be based on differences between different types of actions.

If comparing 350 the target score with the threshold value indicates the target score is less than the threshold value, the reserve price for the user is increased to decrease the number of advertisements eligible for presentation to the user. Similarly, if the comparing 350 the target score with the threshold value indicates that the target score is greater than the threshold value, the reserve price for the user is decreased to increase the number of advertisements eligible for presentation to the user. The reserve price for presenting advertisements to the user is unchanged if comparing 350 the target score with the threshold value indicates the target score equals the threshold value.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving a request to present, in a graphical user interface, a content feed comprising one or more content items to a user of a social networking system, each content item associated with one or more objects maintained by the social networking system;
   selecting one or more advertisements for potential presentation to the user in conjunction with the one or more content items in a content feed, each of the one or more advertisements associated with a bid amount specified by an advertiser;
   determining a first engagement score measuring estimated interaction of the user with a first proposed content feed comprising the one or more content items presented without advertisements, determining the first engagement scores based on prior actions performed by the user on prior content items previously presented to the user;

determining a second engagement score measuring estimated interaction of the user with a second proposed content feed comprising the same one or more content items presented in conjunction with one or more of the advertisements, wherein the second proposed content feed comprises at least one of the advertisements to be presented adjacent to one of the content items and the at least one of the advertisements displaces positions of one or more content items relative to positions of the one or more content items in the first proposed content feed, and determining the second engagement scores based on prior actions performed by the user on prior content items previously presented to the user;

determining a target score based at least in part on the first engagement score measuring estimated interaction of the user with the one or more content items presented without advertisements and the second engagement score measuring estimated interaction of the user with the one or more content items presented in conjunction with one or more of the advertisements, the target score being a metric that describes an estimated change in user interaction with the content feed caused by inclusion of the one or more advertisements in the content feed;

comparing the target score to a threshold value;

modifying, by the social networking system, a reserved price of the content feed of the social networking system based at least in part on the comparison, wherein the reserved price, set by the social networking system, determines a minimum bid amount for advertisements to be eligible for presentation in the content feed to the user, the modifying comprising:
  performing at least one of: 1) increasing, by the socail networking system, the reserved price when the estimated change in user interaction is greater than the threshold value or 2) reducing, by the social networking system, the reserved price when the estimated change in user interaction is less than the threshold value;

selecting one or more of the advertisements for presentation based at least in part on the modified reserved price and the bid amount associated with each advertisement; and presenting the selected one or more advertisements in conjunction with the one or more content items in the graphical user interface.

2. The method of claim 1, wherein determining the target score based at least in part on the first engagement score measuring estimated interaction of the user with the one or more content items presented without advertisements comprises:
  calculating a difference between the first engagement score measuring estimated interaction of the user with the one or more content items presented without advertisements and the second engagement score measuring estimated conjunction with one or more of the advertisements.

3. The method of claim 1, wherein determining the target score based at least in part on the first engagement score measuring estimated interaction of the user with the one or more content items presented without advertisements and the second engagement score measuring estimated interaction of the user with the one or more content items presented in conjunction with one or more of the advertisements comprises:
  calculating a ratio of a difference between the first engagement score measuring estimated interaction of the user with the one or more content items presented without advertisements and the second engagement score measuring estimated interaction of the user with the one or more content items presented in conjunction with one or more of the advertisements, and the first engagement score measuring estimated interaction of the user with the one or more content items presented without advertisements.

4. The method of claim 1, wherein determining the first engagement score measuring estimated interaction of the user with the first proposed content feed comprising the one or more content items presented without advertisements comprises:
  calculating partial engagement scores for the one or more content items, a partial engagement score representing an expected amount of user interaction with a content item;
  adjusting the calculated partial engagement scores based at least in part on position discounts associated with locations of the one or more content items in the first proposed content feed, a position discount representing an expected decrease in user interaction from presenting the content item in a location in the first proposed content feed other than a reference location in the first proposed content feed; and
  combining the determined partial engagement scores to obtain the first engagement score measuring estimated interaction of the user with the one or more content items presented without advertisements.

5. The method of claim 1, wherein determining the second engagement score measuring estimated interaction of the user with the second proposed content feed comprising the same one or more content items presented in conjunction with one or more of the advertisements comprises:
  calculating partial engagement scores for the one or more content items, a partial engagement score representing an expected amount of user interaction with one of the content items;
  adjusting the partial engagement scores for the one or more content items based at least in part on position discounts associated with one or more locations of the one or more content items in the second proposed content feed, a position discount representing an expected decrease in user interaction from presenting the content item in a location in the second proposed content feed other than a reference location in the second proposed content feed;
  combining the adjusted partial engagement scores to obtain a total organic engagement score measuring estimated interaction of the user with the one or more content items;
  calculating partial engagement scores for the one or more advertisements, a partial engagement score representing an expected amount of user interaction with one of the advertisements;
  adjusting the partial engagement scores for the one or more advertisements based at least in part on position discounts associated with one or more locations of the one or more advertisements in the second proposed content feed, the position discount representing an expected decrease in user interaction from presenting the advertisement in the location in the second proposed content feed other than the reference location in the second proposed content feed;
  combining the adjusted partial engagement scores for the one or more advertisements to obtain a total advertisement engagement score measuring estimated interaction of the user with the one or more content items; and generating a total engagement score by combining the total organic engagement score and the total advertisement engagement score, the total engagement score being the second engagement score.

6. The method of claim 5, wherein one or more of the partial engagement scores for the content items are further based on information selected from a group consisting of: a portion of a number of advertisements presented to the user to a number of content items presented to the user, a proportion of the number of content items presented to the user to the number of advertisements presented to the user, one or more types of advertisements presented to the user, and any combination thereof.

7. The method of claim 5, wherein a one or more of the partial engagement scores for the advertisements are further based on information selected from a group consisting of: a proportion of a number of advertisements presented to the user to a number of content items presented to the user, a proportion of the number of content items presented to the user to the number of advertisements presented to the user, one or more types of advertisements presented to the user, and any combination thereof.

8. The method of claim 7, wherein the one or more types of advertisements presented to the user are based on one or more selected from a group consisting of: an objective associated with presenting an advertisement, a destination associated with the advertisement, a bid amount associated with the advertisement, and any combination thereof.

9. The method of claim 1, further comprising:
storing the minimum bid amount associated with the user.

10. The method of claim 1, wherein the reserved price is associated with a location in the graphical user interface presented to the user via a client device.

11. A computer-implemented method comprising:
receiving a request to present, in a graphical user interface, a content feed comprising one or more content items to a user of a social networking system, each content item associated with one or more objects maintained by the social networking system;

selecting one or more advertisements for potential presentation to the user in conjunction with the one or more content items in a content feed, each of the one or more advertisements associated with a bid amount specified by an advertiser;

determining a target score based at least in part on a first engagement score measuring estimated interaction of the user with a first proposed content feed comprising the one or more content items presented without advertisements and a second proposed content feed comprising the same one or more content items presented in conjunction with one or more of the advertisements, the first engagement score and the second engagement score generated based on prior actions performed by the user on prior content items previously presented to the user, the target score being a metric that describes an estimated change in user interaction with the content feed caused by inclusion of the one or more advertisements in the content feed, wherein the second proposed content feed comprises at least one of the advertisements to be presented adjacent to one of the content items; and modifying, by the social networking system, a reserved price of the content feed of the social networking system based at least in part on a comparison of the target score to a threshold value, wherein the reserved price, set by the social networking system, determines a minimum bid amount for advertisements to be eligible for presentation in the content feed to the user, the modifying comprising:

performing at least one of 1) increasing, by the social networking system, the reserved price when the estimated change in user interaction is greater than the threshold value or 2) reducing, by the social networking system, the reserved price when the estimated change in user interaction is less than the threshold value;

selecting one or more of the advertisements for presentation based at least in part on the modified reserved price and the bid amount associated with each advertisement; and presenting the selected one or more advertisements in conjunction with the one or more content items in the graphical user interface.

12. The method of claim 11, wherein determining the target score based at least in part on the first engagement score and the second engagement score comprises:

calculating a difference between the first engagement score measuring estimated interaction of the user with the one or more content items presented without advertisements and the second engagement score measuring estimated interaction of the user with the one or more content items presented in conjunction with one or more of the advertisements.

13. The method of claim 11, wherein determining the target score based at least in part on the first engagement score and the second score comprises:

calculating a ratio of a difference between the first engagement score measuring estimated interaction of the user with the one or more content items presented without advertisements and the second engagement score measuring estimated interaction of the user with the one or more content items presented in conjunction with one or more of the advertisements, and the first engagement score measuring estimated interaction of the user with the one or more content items presented without advertisements.

14. The method of claim 11, wherein the first engagement score measuring estimated interaction of the user with the first proposed content feed comprising the one or more content items presented with out advertisements is determined by:

calculating partial engagement scores for the one or more content items, a partial engagement score representing an expected amount of user interaction with a content item;

adjusting the calculated partial engagement scores based at least in part on position discounts associated with locations of the one or more content items in the first proposed content feed, a position discount representing an expected decrease in user interaction from presenting the content item in a location in the first proposed content feed other than a reference location in the first proposed content feed; and combining the determined partial engagement scores to obtain the first engagement score measuring estimated interaction of the user with the one or more content items presented without advertisements.

15. The method of claim 11, wherein the second engagement score measuring estimated interaction of the user with the second proposed content feed comprising the one or more content items presented in conjunction with one or more of the advertisements is determined by:

calculating partial engage scores for the one or more content items, a partial engagement score representing an unexpected out of user interaction with one of the content items;

adjusting the partial engagement scores for the one or more content items based at least in part on position discounts associated with one or more locations of the one or more content items in the second proposed content feed, a position discount representing an expected decrease in user interaction from presenting the content item in a location in the second proposed content feed other than a reference location in the second proposed content feed;

combining the adjusted partial engagement scores to obtain a total organic engagement score measuring estimated interaction of the user with the one or more content items;

calculating partial engagement scores for the one or more advertisements, a partial engagement score representing an expected amount of user interaction with one of the advertisements;

adjusting the partial engagement scores for the one or more advertisements based at least in part on position discounts associated with one or more locations of the one or more advertisements in the second proposed content feed, the position discount representing an expected decrease in user interaction from presenting the advertisement in the location in the second proposed content feed other than the reference location in the second proposed content feed;

combining the adjusted partial engagement scores for the one or more advertisements to obtain a total advertisement engagement score measuring estimated interaction of the user with the one or more content items; and generating a total engagement score by combining the total organic engagement score and the total advertisement engagement score, the total engagement score being the second engagement score.

16. The method of claim 15, wherein one or more of the partial engagement scores for the advertisements are further based on information selected from a group consisting of: a proportion of a number of advertisements presented to the user to a number of content items presented to the user, a proportion of the number of content items presented to the user to the number of advertisements presented to the user, one or more types of advertisements presented to the user, and any combination thereof.

17. The method of claim 16, wherein the one or more types of advertisements presented to the user are based on one or more selected from a group consisting of: an objective associated with presenting an advertisement, a destination associated with the advertisement, a bid amount associated with the advertisement, and any combination thereof.

18. A system comprising:
a processor; and
a computer-readable storage medium coupled to the processor, the computer-readable storage medium having instructions encoded thereon that, when executed by the processor, cause the processor to:
receive a request to present, in a graphical user interface, a content feed comprising one or more content items to a user of social networking system, each content item associated with one or more objects maintained by the social networking system;
select one or more advertisements for potential presentation to the user in conjunction with the one or more content items, each of the one or more advertisements associated with a bid amount specified by an advertiser;

determine a target score based at least in part on a first engagement score measuring estimated interaction of the user with a first proposed content feed comprising the one or more content items presented without advertisements and a second engagement score measuring estimated interaction of the user with a second proposed content feed comprising the same one or more content items presented in conjunction with one or more of the advertisements, the first engagement score and the second engagement score generated based on prior actions performed by the user on prior content items previously presented to the user, the target score being a metric that describes an estimated change in user interaction with the content feed caused by inclusion of the one or more advertisements in the content feed, wherein the second proposed content feed comprises at least one of the advertisements to be presented adjacent to one of the content items and the at least one of the advertisements displaces positions of one or more content items relative to positions of the one or more content items in the first proposed content feed; and modify, by the social networking system, a reserved price of the content feed of the social networking system based at least in part on a comparison of the target score to a threshold value, wherein the reserved price, set by the social networking system, determines a minimum bid amount for advertisements to be eligible for presentation in the content feed to the user, the modifying comprising:
perform at least one of: 1) increase, by the social networking system, the reserved price when the estimated change in user interaction is greater than the threshold value or 2) reduce, by the social networking system, the reserved price when the the estimated change in user interaction is less than the threshold value;

select one or more of the advertisements for presentation based at least in part on the modified reserved price and the bid amount associated with each advertisement; and present the selected one or more advertisements in conjunction with the one or more content items in the graphical user interface.

19. The system of claim 18, wherein the first engagement score measures estimated interaction of the user with the first proposed content feed comprising the one or more content items presented without advertisements, the first engagement score is determined by:

calculating partial engagement scores for the one or more content items, a partial engagement score representing an expected amount of user interaction with a content item;

adjusting the calculated partial engagement scores based at least in part on position discounts associated with locations of the one or more content items in the first proposed content feed, a position discount representing an expected decrease in user interaction from presenting the content item in a location in the first proposed content feed other than a reference location in the first proposed content feed; and combining the determined partial engagement scores to obtain the first engagement score measuring estimated interaction of the user with the one or more content items presented without advertisements.

20. The system of claim 18, wherein the second engagement score measuring estimated interaction of the user with the second proposed content feed comprising the one or more content items presented in conjunction with one or more of the advertisements is determined by:
- calculating partial engagement scores for the one or more content items, a partial engagement score representing an expected amount of user interaction with one of the content items;
- adjusting the partial engagement scores for the one or more content items based at least in part on position discounts associated with one or more locations of the one or more content items in the second proposed content feed a position discount representing an expected decrease in user interaction from presenting the content item in a location in the second proposed content feed other than a reference location in the second proposed content feed;
- combining the adjusted partial engagement scores to obtain a total organic engagement score measuring estimated interaction of the user with the one or more content items;
- calculating partial engagement scores for the one or more advertisements, a partial engagement score representing an expected amount of user interaction with one of the advertisements;
- adjusting the partial engagement scores for the one or more advertisements based at least in part on position discounts associated with one or more locations of the one or more advertisements in the second proposed content feed. the position discount representing an expected decrease in user interaction from presenting the advertisement in the location in the second proposed content feed other than the reference location in the second proposed content feed;
- combining the adjusted partial engagement scores for the one or more advertisements to obtain a total advertisement engagement score measuring estimated interaction of the user with the one or more content items; and
- generating a total engagement score by combining the total organic engagement score and the total advertisement engagement score, the total engagement score being the second engagement score.

* * * * *